W. H. HORNSBY.
ATTACHMENT FOR HARVESTERS.
APPLICATION FILED MAR. 16, 1915.
1,163,237.
Patented Dec. 7, 1915.
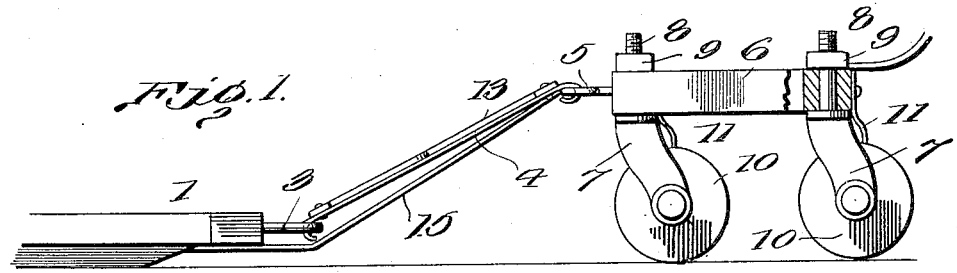
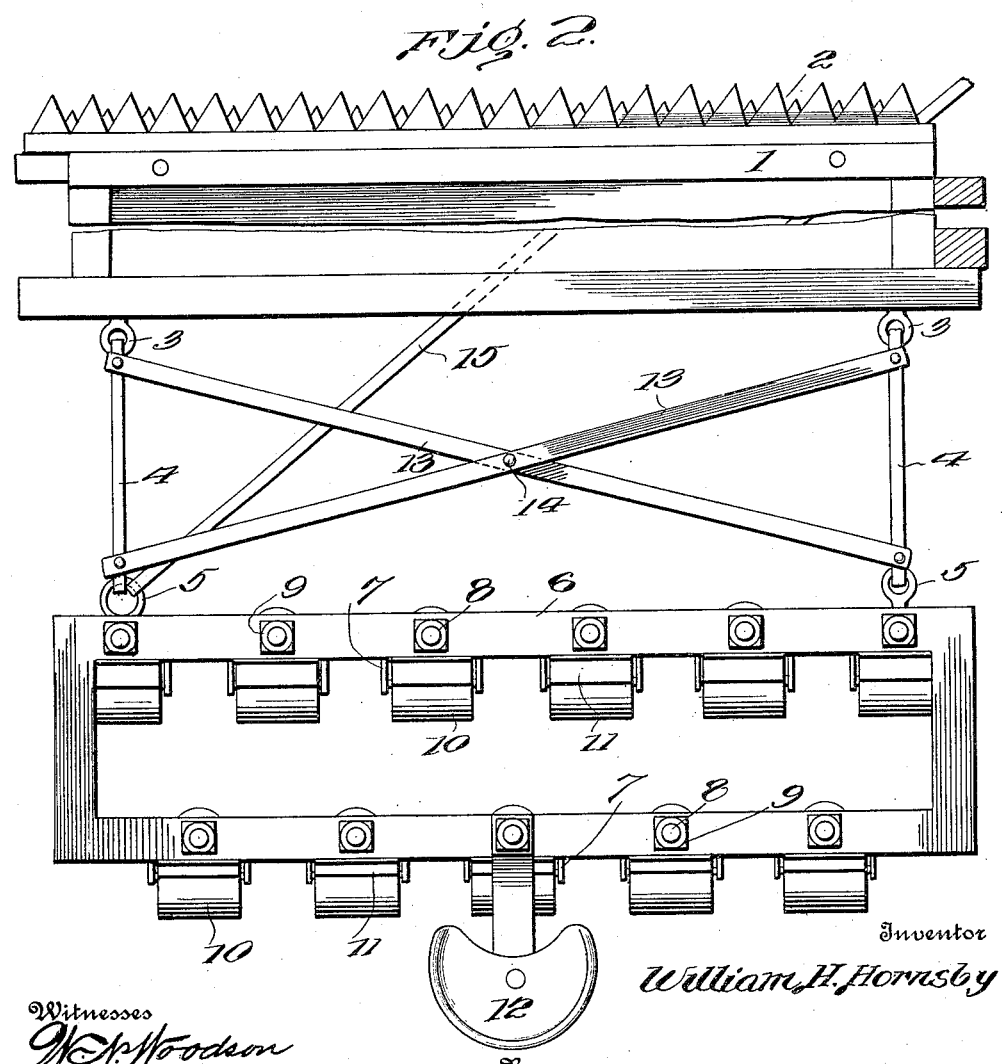
Witnesses
W. N. Woodson
R. W. Bishop
Inventor
William H. Hornsby
By
H. M. Haass, Attorney

UNITED STATES PATENT OFFICE.

WILLIAM H. HORNSBY, OF BRANCH, LOUISIANA.

ATTACHMENT FOR HARVESTERS.

1,163,237.  Specification of Letters Patent.  Patented Dec. 7, 1915.

Application filed March 16, 1915. Serial No. 14,862.

*To all whom it may concern:*

Be it known that I, WILLIAM H. HORNSBY, a citizen of the United States, residing at Branch, in the parish of Acadia and State of Louisiana, have invented certain new and useful Improvements in Attachments for Harvesters, of which the following is a specification.

This invention is an attachment for mowing machines, and has for its object the provision of simple means which may be readily attached to any mower or harvester and which may travel over the field in rear of the cutter platform and break off and press down the stubble left by the cutting of the straw, so that the field will be left smooth and the draft animals will not be harassed and injured by the stubble.

A secondary object of the invention is to provide simple means whereby the device may be attached to the mowing machine, and a further object of the invention is to so construct the attachment that it may be employed as a land roller in connection with other agricultural implements or alone and will readily accommodate itself to the turning movement of the machines so that the return trip may be quickly started or a corner easily rounded.

The several stated objects of the invention, and such other objects as will incidentally appear from the following description, are attained in such a device as is illustrated in the accompanying drawings, and the invention resides in certain novel features which will be particularly pointed out in the claims following the description.

In the drawings: Figure 1 is an end view, partly in section, of my improved device, showing the same in its operative position relative to the platform of a mowing machine; Fig. 2 is a plan view of the same.

In the annexed drawings, the reference numeral 1 indicates the platform of a mowing machine having the cutting apparatus 2 at its front edge. In carrying out my invention, I provide in any convenient or preferred manner upon the rear edge of the platform 1, a pair of eyes or similar attaching devices 3 which are adapted to be engaged by the front ends of pull rods or bars 4 having their rear ends engaged in eyes, rings or similar devices 5 on the front side of the frame 6. This frame 6 is preferably a rectangular frame although it may be of other forms. The essential characteristic of the frame 6 is a pair of parallel bars or beams and other bars connecting the same. In the rectangular formation illustrated, the frame may be a single integral structure with the connections between the parallel bars at the ends of the same, but it will be understood, of course, that the connections between the front and rear parallel bars may be intermediate the ends of the same or may consist of diagonal braces. In the said front and rear parallel bars of the frame, I mount a plurality of caster frames or yokes 7 having their stems 8 swiveled in the frame and secured against dislocation by nuts or similar fastenings 9 mounted on the stems and bearing against the upper sides of the beams. Within the lower ends of the caster frames or yokes are mounted rollers 10 having smooth plane peripheries adapted to run on the ground, as clearly shown in Fig. 1. As shown in Fig. 2, the rollers carried by the rear beam or bar are alined with the spaces between the rollers carried by the front bar or beam so that, as the device is drawn over the field, the entire surface of the ground will be pressed down firmly and smoothly and the short stems or stubbles of straw left by the mower will be broken off close to the surface and will not be left standing to scratch and irritate the limbs of the draft animals upon the return trip of the machine.

It will be readily noted that the rollers are independently mounted in the frame so that, when the device is turning a corner or is being reversed at the end of its travel across the field in one direction, each roller will swing about its own stem or pivotal point independently of all the others, the result being that the device may be turned within a very short space and may readily pass around sharp corners.

A scraper 11 is secured upon the frame directly over each roller, and these scrapers bear upon their respective rollers at the highest point thereof so that they will offer no interference with the rollers in the pivotal movement of the same. A seat 12 may be provided upon the frame 6, and to reinforce the pull bars 4, I provide braces 13 which extend between the said bars and are attached thereto near the front and rear ends of the same so as to reinforce the said bars against lateral strain. The said braces 13 may be disposed diagonally, as illustrated in the drawings, and may be connected, as at 14, at their point of intersection. I also employ a draft bar 15 extending from the far eyebolt 5 under the platform to the tongue, thereby relieving the platform frame of some of the pulling strain and preventing the attachment from swinging from the line of draft.

My device is obviously simple and inexpensive and may be attached to any harvester or mowing machine. By its use, all the stubble or short straw is completely broken down and the field left smooth so that the team may travel over the cleared ground without any liability to be scratched and irritated as now occurs.

The device may be easily attached to or detached from the mowing machine and may be used as an independent land roller by harnessing the draft animals directly to the pull bars 4, as will be readily understood.

It will also be understood that the device may be readily attached to a harrow or to a planter so that the soil will be in proper condition to protect young plants and tend to produce a superior crop. As the stubble is broken off short and even with the surface of the ground, it is completely destroyed and does not sprout and produce a crop of inferior quality during the following year.

Having thus described the invention, what is claimed as new is:—

1. The combination with an agricultural machine having a platform, of eyes on the rear side of the machine platform, draft bars having their front ends engaged in said eyes, a trailer frame disposed in rear of the platform, eyes on the front side of said trailer frame engaged by the rear ends of the draft bars, a plurality of rollers swiveled in said frame, and a draft bar having its rear end engaged in the far eye on the trailer frame and extending forwardly and inwardly therefrom under the platform of the agricultural machine.

2. An apparatus for the purpose set forth comprising a rigid frame having front and rear parallel bars, a plurality of rollers independently swiveled in each of said bars, eyes on the front side of the front bar, pull rods having their rear ends hung in said eyes, and diagonally disposed braces having their ends attached to said pull rods near the front and rear ends of the same, the said braces being connected at their point of intersection.

In testimony whereof I affix my signature in presence of two witnesses.

WILLIAM H. HORNSBY. [L. S.]

Witnesses:
 HOMER BAROUSSE,
 H. J. DAVID.

Copies of this patent may be obtained for five cents each, by addressing the "Commissioner of Patents, Washington, D. C."